Jan. 12, 1954
D. G. KEENER
2,665,493
TAIL STOCK INDICATOR HOLDER
Filed Feb. 16, 1951
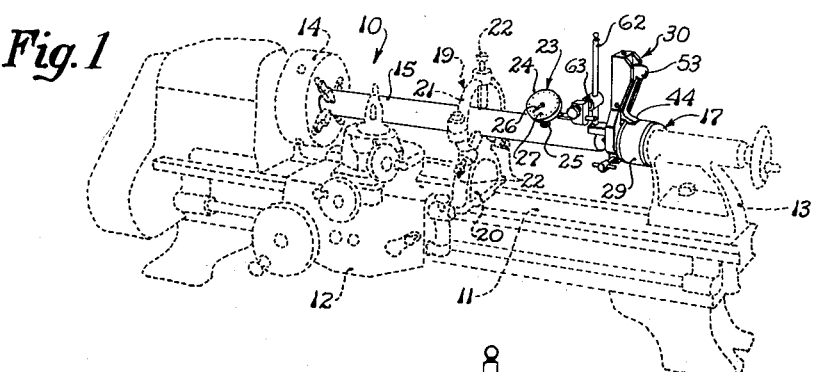
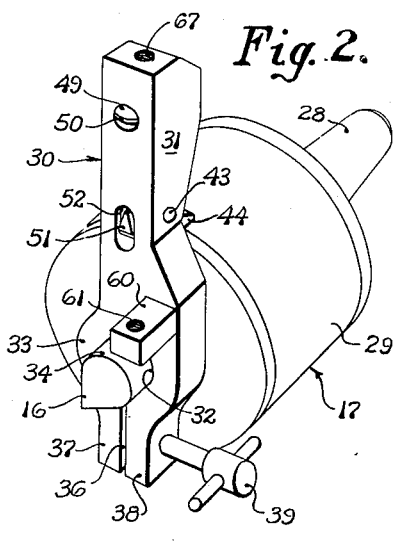
INVENTOR.
Donald G. Keener
BY
Leslie M. Hansen
HIS ATTORNEY.

Patented Jan. 12, 1954

2,665,493

UNITED STATES PATENT OFFICE 2,665,493

TAIL STOCK INDICATOR HOLDER

Donald G. Keener, Agnew, Calif.

Application February 16, 1951, Serial No. 211,411

7 Claims. (Cl. 33—172)

This invention relates to centering devices for use in connection with machine tools such as lathes and more particularly to an indicator holder cooperable with a lathe tail stock center pin for facilitating variable disposition of an indicator relative to the axis of a piece of work for attaining accurate centering of the latter.

Various types of aligning devices have been proposed but in most cases they involve intricate machining and numerous moving parts rendering them expensive and therefore available only to adequately financed machine tool shops.

The present invention has as one object to provide an indicator holder of simple and inexpensive construction adapted for ready use on a conventional tail stock center pin.

Another object of this invention is to provide an indicator holder cooperable with the tail stock center pin for turning movement about the center pin to thereby enable checking alignment of the work from various radial positions relative to its axis of rotation.

Another object is to provide an indicator supporting arm cooperable with a tail stock center in such a manner as to enable setting of said arm in different radial positions relative to the otherwise fixed centering pin secured in the tail stock of a lathe in conventional manner.

These and other objects and advantages of the present invention will become apparent in the following description when read in the light of the drawings in which:

Fig. 1 is a dotted line perspective view of a lathe illustrative of an application of the indicator holder to the tail stock, the latter of which is shown in full lines.

Fig. 2 is a perspective view of one form of indicator holder of the present invention shown united to a ball bearing type center pin of conventional design.

Fig. 3 is a side elevation of Fig. 2 showing part of the indicator holder broken away for purposes of illustration.

Fig. 4 is a perspective view of a more simplified form of indicator holder made in accordance with the present invention for use on a simple center pin.

Fig. 5 is a vertical section of Fig. 4 taken transversely of the center pin and lengthwise the indicator holder arm.

Referring now to Fig. 1 of the drawings, a conventional lathe is shown at 10 as having a bed 11 upon which a tool carriage 12 and a tail stock 13 are each movable independently of the other lengthwise toward and from a chuck 14.

The chuck 14 is adapted for gripping one end of round stock material such as the work piece 15 having its opposite end disposed for engagement with the point 16 of a centering pin 17 suitably secured in the tail stock axially of the latter and the chuck.

When the work piece 15 is first gripped by the jaws of the chuck 14 the axis of the piece 15 will seldom be in axial alignment with the axis of the chuck and tail stock. Consequently a truing up process is required in order to place the axis of the work piece in axial alignment, i. e., centered on the chuck axis and on the tail stock center of the lathe.

The aforementioned truing up is accomplished with a steadyrest such as is shown at 19 in Fig. 1. This steadyrest which is of conventional design comprises a base 20 movable along the lathe bed 11 and includes a looped frame 21 which encircles the work piece 15. The looped frame 21 is of much larger diameter than the size of the work piece so as to permit free rotation of the latter even though it is out of axial alignment with the chuck to tail stock axis of the lathe.

Arranged at equal angles from each other around the looped frame 21 are a plurality of (usually three) radially advanceable and/or retractable screw pins 22. The inner ends of these pins 22 engage the periphery of the work piece 15 to urge the latter into axial alignment with the chuck to tail stock axis of the lathe. However, to assure absolute centering or alignment of the work piece, an indicator such as the one shown at 23, Fig. 1, is employed.

The indicator 23 is of the type having a case 24 carrying a feeler button 25 associated with a needle 26 movable over a dial 27 so as to detect any deviation or misalignment of a member engaged by the button 25. Obviously, the case 24 of the indicator 23 must be securely supported relative to the chuck to tail stock axis of a lathe in order to accurately detect any deviation or misalignment of the work piece to be trued up. It is with this phase of the truing up process that the present invention is concerned.

The centering pin 17, hereinbefore referred to, although of conventional design, may be of any well known form which includes a point 16 and a tapered end or quill 28 adapted to have a very fine but close sliding fit into a socket, not shown, provided in the tail stock 13.

In Figs. 1, 2 and 3 of the present case the tail stock centering pin is of a well known ball bearing type. In this type of centering pin the pointed end 16 is free to rotate relative to its tapered end 28 by means of ball bearing arrangement within an enlarged housing 29 formed on the tapered end of the pin 17. In Figs. 4 and 5 of the present case the tail stock centering pin 17' is of a more simplified form in that its pointed end 16' and its tapered end 28' are formed integrally with each other.

The inventive characteristics of the indicator holder in the present application are equally adaptable to one or the other of the two forms of centering pins referred to. However, in adapting the indicator holder embodying the present invention to either form of centering pin a slight modification in construction is required as will now become apparent.

In conjunction with the ball bearing centering pin shown in Figs. 1, 2 and 3 an indicator holder 30 is shown. This holder 30 comprises an arm 31 having an annular passage 32 formed at one end 33 to slip-fit onto the reduced cylindrical portion 34 adjacent the pointed end 16 of the centering pin 17. The end 33 of the arm 31 is relatively flat so as to lie up against the front face 35 of the ball bearing housing 29. The end 33 is of split construction in a plane coincident to the axis of the pin 17 as seen at 36 clear through to the passage 32 to provide lugs 37 and 38 adapted to be pressed toward each other for firmly gripping the cylindrical portion 34 of the centering pin 17. To accomplish the foregoing a thumb screw 39 having its threaded end passing freely through a hole in the lug 38 and screwed into a tapped hole in the lug 37 effects tightening of these lugs relative to the portion 34 of the pin 17.

From the foregoing it will be apparent that the arm 31, although firmly secured to the reduced cylindrical portion 34 of the centering pin 17, is free to turn about the axis of the centering pin 17 with the rotatable portion, i. e., pointed end 16, thereof. Means for frictionally engaging a fixed part of the centering pin 17 comprises a spring urged lever 40 pivotally mounted as at 41 on the arm 31. In this connection it will be noted that the arm 31 is recessed as at 42 in a plane coincident to the axis of the centering pin 17. This recess 42 is so formed as to receive the lever 40 and to form a trunnion mounting for the pin 43 which extends from either side of the lower end of lever 40 to form the pivotal mounting 41 therefor.

The lever 40 has an offset extension or presser foot 44 adjacent its pivotal mounting adapted to bear against the periphery of the housing 29 for the ball bearings of the centering pin 17. The opposite or free end 45 of the lever 40 has a seat 46 formed on its inner face to receive one end of a compression spring 47. The opposite end of spring 47 is mounted on a reduced stud end 48 of a screw 49 threadedly mounted in the base of the recessed portion of the arm 31. This screw 49 has a key formation 50 in its face which is exposed through the arm 31 whereby the screw can be turned to vary the pressure with which the compression spring 47 bears against the free end 45 of the lever 40.

From the foregoing it will be apparent that the spring 47 normally urges the lever 40 outwardly of the recess 42 whereby the offset extension or presser foot 44 is maintained in braking engagement with the housing 29. However, when the holder arm 31 is removed from the centering pin the outward movement of the lever 40, under the influence of spring 47, is limited by a stop lug 51. This stop lug 51 is formed on the lever 40 adjacent the pivotal mounting thereof and diametrically opposite the presser foot 44 for engagement with a ledge 52 formed on the lower end of the base of the recess 42. In this manner, the lever 40 is normally set a little beyond actual gripping position relative to the arm 31. However, the free end 45 of the lever 40 is provided with a knob 53 which extends beyond the recess 42 for facilitating manual depression of the lever 40 against the action of the compression spring 47. Thus it will be seen that the presser foot 44 is readily retracted during mounting of the arm 31 upon the centering pin. Moreover, upon depressing of the knob 53, the arm 31 is free to be moved into any desired radial disposition relative to the axis of the centering pin 17. After placement of the arm 31 at the desired radial position the knob is released and spring 47 immediately urges the lever 40 outwardly to brakingly force the presser foot 44 against the periphery of the housing 29.

In conjunction with the simplified form of centering pin 17' shown in Figs. 4 and 5 an indicator holder 30' is shown. This holder comprises an arm 31' having an annular passage 32' formed at one of its ends 33' to slip-fit onto the reduced cylindrical portion 34' adjacent the pointed end 16' of the centering pin 17'. The end 33' of arm 31' is flat and fits up against the shoulder 35' formed between the tapered shank 28' and the portion 34' of the pin 17'.

The end of the cylindrical portion 34' is threaded as at 36' adjacent the pointed end 16' for receiving two jam nuts 37' and 38' adapted to be pressed toward each other upon the threading 36' to provide a stop collar 39' on the cylinder 34' for retaining the arm 31' thereon. The jam nuts 37'–38' are not pressed against the arm 31' and therefore the arm is free to turn about the axis of the centering pin 17'.

The arm 31' is recessed as at 42' in the plane of rotation of the arm 31' about the axis of the centering pin 17'. A lever 40' is pivotally mounted adjacent its lower end as at 41' within the recess 42', the lever carrying a pin 43' which extends from either side of the lever into the trunnion-like side walls of the recess 42'.

The recess 42' exposes substantially one quadrant of the passage 32' formed in the end 33' of the arm 31'. The lever 40' has an offset presser foot 44' adjacent its pivot 41' and extendable through the open quadrant of the passage 32' to engage the periphery of the reduced cylindrical portion 34' of the centering pin upon which the arm 31' is mounted.

The free end 45' of the lever 40' has a seat 46' for one end of a compression spring 47' the opposite end of which is mounted on the reduced end 48' of a screw 49'. This screw 49' is threadedly mounted in the base of the recess 42' so as to expose the keyed end 50' of the screw on the opposite outer face of the arm 31'. The spring 47' normally urges the lever 40' in a direction to cause the presser foot 44' to brakingly engage the periphery of the cylindrical portion 34' of the centering pin 17'. However, when the arm 31' is removed from the centering pin 17' a stop lug 51' formed on the presser foot 44' engages one margin 52' of the quadrant portion of the recess 42' to limit further movement of the lever 40' under the influence of the compression spring 47'.

The free end 45' of the lever 40' is provided with a knob 53' which extends outwardly the recess 42' for manipulation to thereby retract the presser foot 44' from engagement with the portion 34' of the centering pin. However, when the knob 53' is released, the spring 47' presses the foot 44' against the portion 34' of the centering pin in brake-like action to securely hold the arm 31' in any radial position relative to the axis of the centering pin 17'.

In either of the foregoing forms of indicator holders, 30 and 30', it will be noted that a lug 60 or 60', respectively, is provided. In each case this lug extends substantially parallel with the chuck to tail stock axis of the lathe but is slightly offset, preferably to the front side of the lathe where a machinist would stand to operate the lathe.

This lug 60 or 60' has a tapped bore 61 or 61', respectively, for receiving a mounting post 62 (see Fig. 1) forming a part of the equipment supplied with the indicator 23, hereinbefore referred to. A collar 63 rides the post 62 and is secured thereto by a radially disposed set screw 64 carrying a block 65. The block 65 has a bore transverse of and offset relative to the axis of the set screw 64 for receiving a rod 66, one end of which is attached to the case 24 of the indicator 23.

Should the diameter of the work piece 15 be considerably greater than shown, the post 62 must be mounted on the holder 30 or 30' a greater distance from the chuck to tail stock axis. In this connection the extreme end of the arm 31—31' is provided with a tapped bore 67 or 67', as the case may be. The tapped bore 67—67' is comparable to the bore 61—61' respectively, for receiving the threaded end of the post 62.

The arm 31—31' of the holder 30—30' is initially set in a vertical position, radially of the centering pin and locked thereon by the spring urged lever 40—40' and its presser foot 44—44'. The set screw 64 is then manipulated to adjust the collar 63 on the post 62 and the rod 66 within the block 65 so that the case 24 of the indicator is positioned with the feeler button 25 in engagement with the periphery of the work piece 15 in the region of the free end thereof, i. e., opposite the chuck 14.

Thus, the reading of the needle 26 on the dial 27 may be zero or plus 5 or 10 thousandths of an inch. The machinist then depresses the knob 53—53' releasing the presser foot 44—44' from engagement with the stationary part 29 or 34' of the centering pin 17—17' and turns the arm 31—31' about the axis of the latter. In the course of the foregoing the feeler button 25 is caused to travel circumferentially about the periphery of the work piece 15 through an arc of at least 180° or better. In this manner misalignment of the work piece 15 is readily detected by the readings on the indicator 23 so that by manipulating the screws 22 of the steadyrest 19 the work piece can eventually be brought into a position wherein all readings on the indicator will be zero.

It will be apparent that the indicator holder of the present invention is equally adaptable for holding the indicator 23 for various purposes of truing up. For example, when the universal connections between the post 62 and rod 66 are properly adjusted, the feeler button 25 can be disposed for movement parallel to the chuck to tail stock axis of the lathe. When so disposed the button 25 can be brought into contact with the vertical face of a piece of work supported for rotation by the chuck 14 for truing up the face of the work in the chuck in much the same manner as hereinbefore explained in connection with the truing up of round stock.

While I have described my indicator holder in specific detail it will be apparent to those skilled in the art that it can be varied, modified and altered in many ways without departing from the spirit of my invention. I, therefore, desire to avail myself of all variations, modifications and alterations as fairly come within the purview of the appended claims.

What I claim as new and desire to protect by Letters Patent is:

1. A centering device for truing up a work piece mounted between the chuck and the tail stock center pin of a lathe; said device comprising an arm constructed and arranged for co-axial journal mounting on the lathe center pin to leave the point of the latter exposed, said arm extending radially from the center pin axis, means on said arm for securing an indicator thereto with a feeler button engaging said work piece, and manually releasable braking means on said arm for engaging a fixed part of said center pin, said braking means comprising a spring urged presser foot pivotally mounted on said arm, and means for biasing said presser foot into pressing engagement with said center pin.

2. A centering device for truing up a work piece mounted to extend between the chuck and the tail stock center pin of a lathe; said device comprising an arm constructed and arranged for mounting on the lathe center pin to extend radially therefrom and to leave the point of the center pin exposed, the arm being rotatively movable about the axis of the center pin, means on said arm for mounting an indicator having a feeler button thereon in a manner to present the feeler button to a predetermined surface of the work piece, a lever pivotally mounted on said arm and having a presser portion thereof disposed frictionally to engage a non-rotative portion of said center pin, and spring means acting on said lever for yieldably urging the latter to move its presser portion into braking engagement with the lathe center pin to retain the arm and an indicator thereon against rotative displacement about said axis, said lever having a portion thereof disposed for manually moving the lever against the bias of said spring to free the presser portion from the center pin for rotative adjustment of the lever and an indicator thereon.

3. A centering device for truing up a work piece in a lathe comprising an arm constructed for journal mounting on the center pin of a lathe for rotative movement in a plane transverse to the center pin axis, means on said arm for securing an indicator thereto for rotative movement therewith, said arm having a recess formed therein, a lever disposed in said recess and having pivotal connection with said arm in the region thereof adjacent said center pin, a presser foot on said lever adapted to engage said center pin in a predetermined position of said lever, and spring means between said arm and said lever for urging the latter in a direction to force said presser foot against said center pin, said lever having a portion thereof disposed for manually moving the lever against the bias of said spring to free the presser foot from the center pin for rotative adjustment of the lever and an indicator thereon.

4. A centering device for truing up a work piece in a lathe, comprising an arm having a passage formed adjacent one end thereof so as to slip-fit into journaled support upon said center pin outwardly of its pointed end whereby said arm extends radially from the center pin leaving its pointed end exposed for engaging a work piece, means for retaining said arm in the aforesaid position on said center pin for rotative movement about the axis of said center pin, means on said arm for securing an indicator having a feeler button thereon with the feeler button disposed to engage the work piece to be trued up, a lever pivotally mounted on said arm, a presser foot on said lever engageable with a non-rotative portion of said center pin, and spring means between said arm and said lever for releasably urging the latter in a direction to force the presser foot thereon into braking engagement with a non-rotative portion of the center pin, said lever having a portion thereof disposed for manually moving the lever against the bias of said spring to free the presser foot from the center pin for rotative adjustment of the lever and an indicator thereon.

5. A centering device for truing up a work piece in a lathe, comprising an arm having a passage formed adjacent one end thereof so as to slip-fit into journaled support upon a lathe center pin outwardly of its pointed end whereby said arm extends radially from the center pin leaving its pointed end exposed for engaging a work piece, means for retaining said arm in the aforesaid position for rotative movement about the axis of said center pin, means on said arm for securing an indicator having a feeler button thereon, the feeler button disposed to engage the work piece to be trued up, said arm having a recess formed therein, a lever arranged in said recess, means pivotally connecting said lever to said arm in the region of said center pin, a presser foot on said lever and extending substantially radially relative to said means for pivotally connecting said lever to said arm whereby said presser foot is disposed to engage a non-rotative portion of said center pin, and spring means between said arm and said lever for releasably urging the latter in a direction to effect binding engagement of said presser foot with said non-rotative portion of said center pin, said lever having a portion thereof disposed for manually moving the lever against the bias of said spring to free the presser foot from the center pin for rotative adjustment of the lever and and an indicator thereon.

6. A tail stock indicator holder comprising a bearing portion for slip-fit journal mounting on a lathe center pin to leave the point of the pin exposed, an arm mounted to extend radially from said bearing portion for rotative adjustment about the center pin axis, means on said arm for securing an indicator thereto, said arm having a recess formed therein, a lever arranged within the recess formed in said arm and pivotally connected to said arm for movement into and out of said recess, a presser foot on said lever adapted to engage a relatively fixed portion of the center pin, and spring means between said arm and said lever for normally urging the latter in a direction to force the presser foot into braking engagement with the relatively fixed portion of the center pin to retain the arm and the indicator in rotatively adjusted position, said lever having a portion thereof disposed for manually moving the lever against the bias of said spring to free the presser foot from the center pin for rotative adjustment of the lever and an indicator thereon.

7. A tail stock indicator holder comprising an arm having a passage formed therethrough adjacent one end thereof adapted to fit upon one free end of a lathe center pin, means for securing said arm on a lathe center pin for free rotative movement about the axis thereof, said arm having a recess formed between opposing walls thereof so that said arm is substantially of U cross sectional shape, a lever arranged in said recess, a pivot pin extending through said opposing side walls of said arm and said lever in the region of said center pin passage, a presser foot on said lever extending substantially radially relative to the axis of said pivot pin for engaging a non-rotative portion of a lathe center pin upon which the arm is mounted, a manually engageable knob formed at the free end of said lever to be exposed exteriorly of said recess, said lever having a seat formed on a side thereof opposite said knob, a compression spring arranged in said recess and having one of its ends disposed in said seat, and a threaded stud extending through the bight of the U shaped portion of said arm for engaging the end of said spring opposite that disposed in said seat for urging said spring against said lever with sufficient pressure to effect a brake-like engagement of said presser foot against the non-rotative portion of the center pin.

DONALD G. KEENER.

References Cited in the file of this patent

UNITED STATES PATENTS

| Number | Name | Date |
| --- | --- | --- |
| 1,403,985 | Spencer | Jan. 17, 1922 |
| 1,437,734 | Kessler | Dec. 5, 1922 |
| 1,444,080 | Nyman | Feb. 6, 1923 |
| 1,522,299 | Hampton | Jan. 6, 1925 |
| 2,403,919 | Hagner | July 16, 1946 |
| 2,493,332 | Aubin | Jan. 3, 1950 |
| 2,516,053 | Farkas | July 18, 1950 |
| 2,564,897 | Hahn | Aug. 21, 1951 |

FOREIGN PATENTS

| Number | Country | Date |
| --- | --- | --- |
| 714,506 | Germany | Dec. 1, 1941 |